W. S. CARR.
COCK FOR WATER CLOSETS.
No. 30,462.                              Patented Oct. 23, 1860.
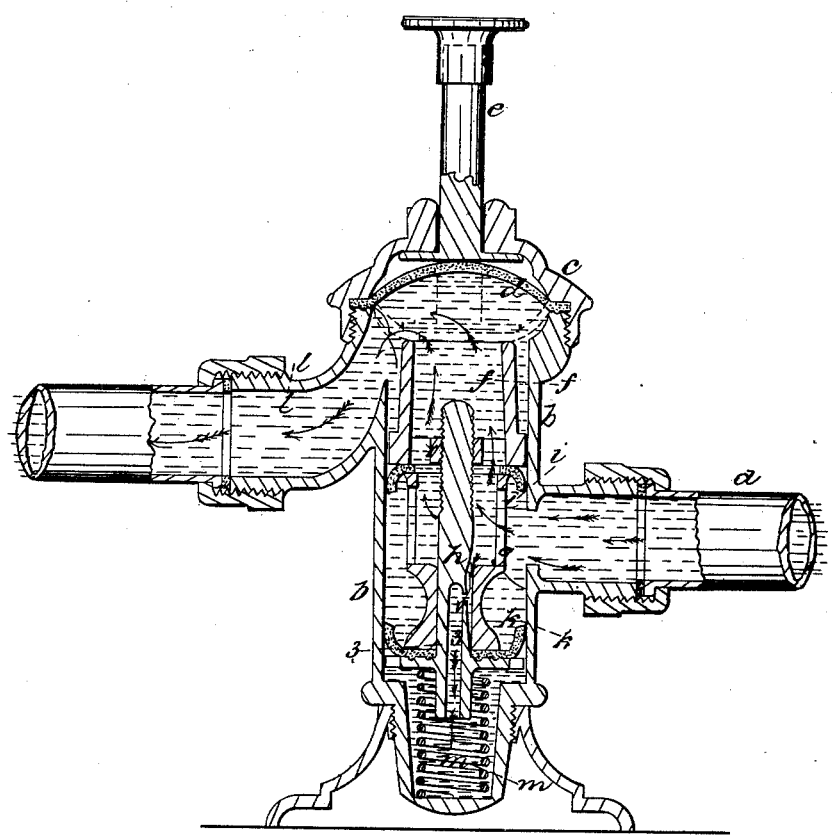
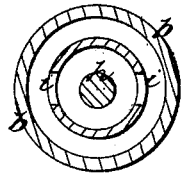
Witnesses:
Lemuel W. Serrell
Thos. Geo. Harold
Inventor
William S. Carr

UNITED STATES PATENT OFFICE.

WILLIAM S. CARR, OF NEW YORK, N. Y.

VALVE FOR WATER-CLOSETS.

Specification of Letters Patent No. 30,462, dated October 23, 1860.

*To all whom it may concern:*

Be it known that I, WILLIAM S. CARR, of the city and State of New York, have invented, made, and applied to use certain new and useful Improvements in Cocks for Water-Closets, Hydrants, &c.; and I do hereby declare that the following is a full, clear, and exact description of the nature of my said invention, reference being had to the annexed drawing, making part of this specification, wherein—

Figure 1, is a vertical section of my said cock as open for the water to run to the closet. Fig. 2, is a sectional plan of the plunger valve.

The same characters denote corresponding parts.

Great necessity exists for a water closet cock that will be self acting by the weight of the person on the seat and that will not waste any water by allowing it to run before the person rises from said seat, and that will close gradually and tightly by its own movement without producing any concussion or vibration as the water is shut off. In all self acting cocks the greater the pressure of water the more difficult it is to avoid the evils before named.

My invention I have found practically to overcome all the difficulties before alluded to; at the same time the construction is simple and all the working parts can be removed for repair without disturbing the pipes connecting to said cock.

My invention consists of a sliding plunger and valve, that either allows the water to run through it to the closet, or effectually but gradually shuts off the flow of water, and said valve is operative only when relieved of pressure, by the person rising from the seat or otherwise, and this cock or valve although especially adapted to water closets, may be used for self-closing hydrants, faucets, &c.

In the drawing $a$, is the pipe from a suitable supply of water connected to the cylinder $b$, by any usual coupling, and $l$, is the pipe to the water closet. This cylinder $b$, is bored out smooth and parallel, and provided with a screw cap $c$, confining the diaphragm $d$, to the upper end of the cylinder $b$, and $e$, is a rod formed with disk or circular end beneath the cap $c$, between that and the diaphragm $d$. The sliding plunger within the cylinder $b$, is formed of three parts $f$, $g$ $h$, which receive and confine cup leathers $i$, $k$. The part $f$ of the plunger is formed as a hollow cylinder with a cross bridge 1, taking the screw of the part $h$, and the intermediate portion $g$ is a slotted cylinder. The cup leather $i$, is confined between $g$ and $f$, and is formed with an opening in the middle so as not to obstruct the flow of water through $f$ and $g$ as indicated by the arrows. The cup leathers come toward each other, and hence water from the pipe $a$, that is intermediate cannot escape by them. The chamber below $k$, acts to allow the valve plunger to close gradually as water passes into said chamber through the hole 3, formed in the stem $h$, the side of said stem being removed as at 2, to allow of the water passing into the center hole 3.

The operation is as follows.—When the cock is not in use the spring $m$, forces the end of the cylinder $f$ up against the elastic diaphragm $d$, and closes the water way at this point, the cup leathers $i$, $k$, always keeping tight against the cylinder $b$, above and below. The opening to the pipe $a$, effectually prevents water passing into the closet; and these cup leathers never have to slide past any openings when in use hence remain uninjured for a very long time. Upon any person occupying the seat, the rod $e$, is pressed down by any suitable rod or connection to the seat (said seat being fitted to move as usual,) and the valve plunger ($f$, $g$, $h$,) is also pressed down more or less, according to the weight on the seat compared with the pressure and the spring $m$, the diaphragm $d$, still intervening and keeping the parts tight as shown by red lines. As soon as the weight or pressure on the rod $e$, is removed the diaphragm $d$, and rod $e$, are forced by the water up into the position shown in the drawing and the water flows through the slotted cylinder $g$, and cylinder $f$, to the pipe $l$, thence to the water closet. The spring $m$, raises up this plunger valve only as fast as the water can flow into the lower chamber through the hole 3, the pressure of water being balanced between the cup leathers $i$, $k$. This valve plunger is moved gradually and slowly until the upper end of $f$, closes onto the elastic diaphragm $d$, and the water is entirely shut off from the closet. The spring $m$, and accumulation of pressure causes the cylinder $f$, to set tightly to the diaphragm.

The simplicity in the construction of this cock, its durability, the ease with which the whole plunger valve is removed for cleaning or repair commend it for use in self acting water closets, in hydrants or wherever available.

It will be evident that this cock might be modified in such a manner as to dispense with the spring m, by forming the upper part of the cylinder b, and the cup leather i, larger so that the increased area of the upper cup leather will cause the pressure of water to move the valve.

I do not limit myself to the rod e, and diaphragm for moving the plunger valve, as other devices might be used.

Having thus described my said invention what I claim, and desire to secure by Letters Patent, is—

A hollow plunger valve moving within a cylinder and controlled substantially as specified, to form both a water way and valve as set forth.

In witness whereof I have hereunto set my signature this eighteenth day of July 1860.

WILLIAM S. CARR.

Witnesses:
LEMUEL W. SERRELL,
THOS. GEO. HAROLD.